(12) United States Patent
Dodane et al.

(10) Patent No.: US 10,743,716 B2
(45) Date of Patent: Aug. 18, 2020

(54) REMOVABLE GRIPPING DEVICE FOR EAR-SHAPED HOLDING MEMBER OF A KITCHEN UTENSIL

(71) Applicant: CRISTEL, Fesches-le-Chatel (FR)

(72) Inventors: Paul Dodane, Fesches-le-Chatel (FR); Pascal Drouville, Danjoutin (FR)

(73) Assignee: CRISTEL, Fesches-le-Chatel (FR)

( * ) Notice: Subject to any disclaimer, the term of this patent is extended or adjusted under 35 U.S.C. 154(b) by 651 days.

(21) Appl. No.: 15/593,682

(22) Filed: May 12, 2017

(65) Prior Publication Data
US 2017/0340171 A1    Nov. 30, 2017

(30) Foreign Application Priority Data

May 30, 2016 (FR) ...................................... 16 54846
Jul. 21, 2016 (FR) ...................................... 16 56945

(51) Int. Cl.
*A47J 45/07*        (2006.01)
(52) U.S. Cl.
CPC ........... *A47J 45/071* (2013.01); *A47J 45/072* (2013.01)
(58) Field of Classification Search
CPC ......... A47J 45/071; A47J 45/072; A47J 45/10
See application file for complete search history.

(56) References Cited

U.S. PATENT DOCUMENTS

| 1,784,112 A * | 12/1930 | Rosano | ................... | A47J 45/10 |
| | | | | 294/31.1 |
| 3,878,584 A | 4/1975 | Witte | | |
| 6,260,733 B1 | 7/2001 | Eimerman | | |
| 6,694,868 B1 | 2/2004 | Hung | | |
| 2003/0183088 A1* | 10/2003 | Dodane | ................... | A47J 45/10 |
| | | | | 99/403 |

FOREIGN PATENT DOCUMENTS

EP        0 458 254 A2    11/1991

* cited by examiner

*Primary Examiner* — Andrew T Kirsch
*Assistant Examiner* — Don M Anderson
(74) *Attorney, Agent, or Firm* — Craft Chu PLLC; Andrew W. Chu

(57) ABSTRACT

The removable gripping device for an ear-shaped holding member of a kitchen utensil includes a case with a housing in the form of a slit with a height to at least partially accommodate the latter by nesting and with functional play. The case also has a latch able to occupy at least a locked position and an unlocked position in order, depending on the case, to block or free the removable gripping device on this holding member. In combination with and independently of the locking/unlocking function, at least one retaining pad extends at least partially in the slit-shaped housing so as to define, in the latter, at least one passage section adjusted to the thickness of the holding member. The pad, in its part at least extending in the housing is made from a flexible material to retract under stress.

15 Claims, 3 Drawing Sheets

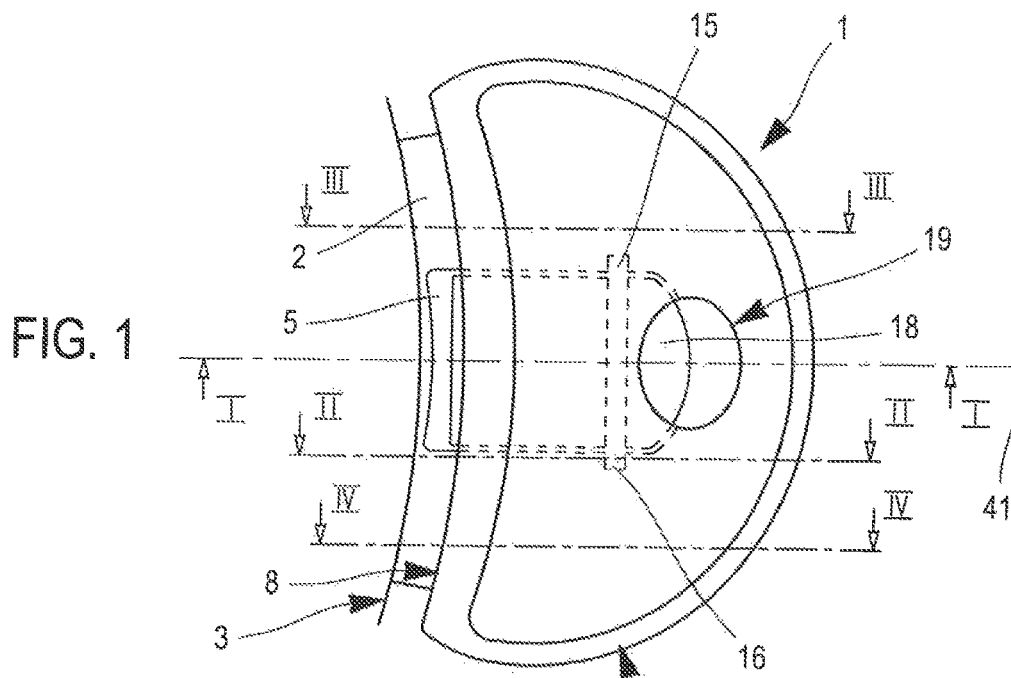
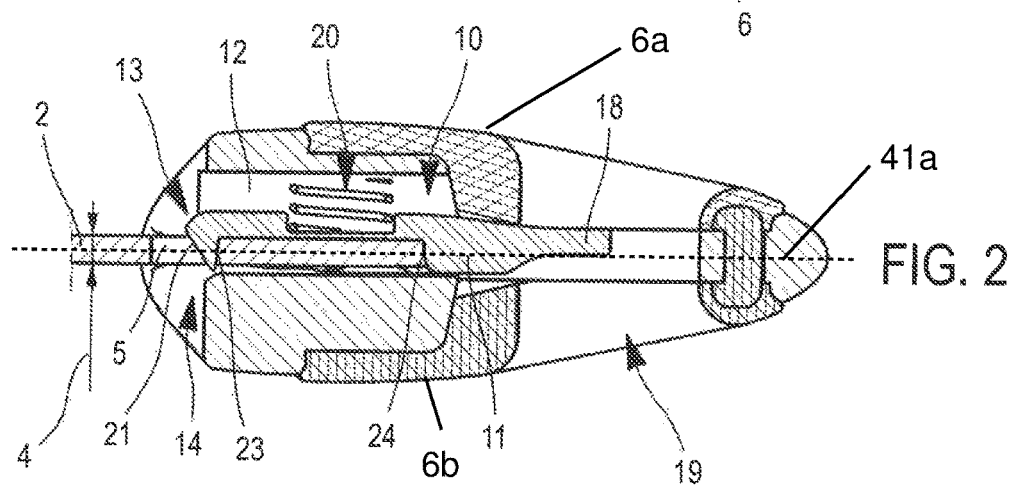
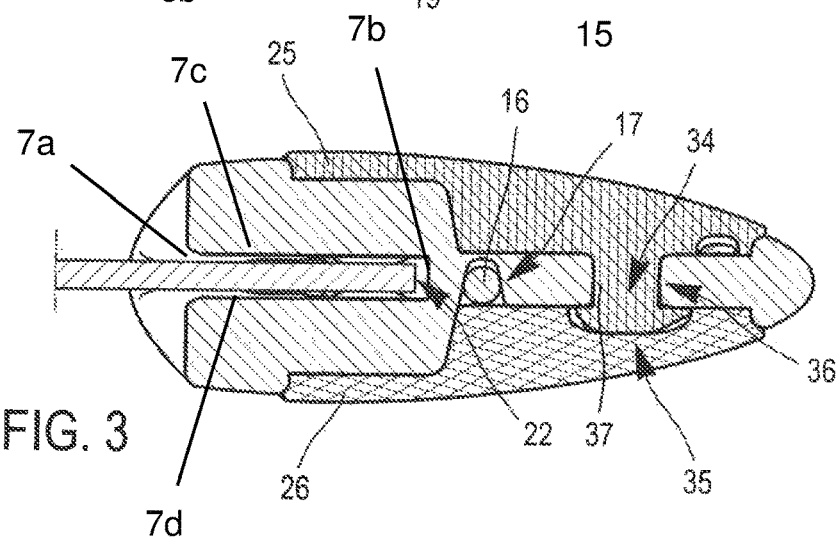

REMOVABLE GRIPPING DEVICE FOR EAR-SHAPED HOLDING MEMBER OF A KITCHEN UTENSIL

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The invention relates to a removable gripping device for an ear-shaped holding member of a kitchen utensil, the device including a case comprising a housing in the form of a slit with a width adapted to the thickness of the holding member to at least partially accommodate the latter by nesting and with functional play, this case being further provided with a latch able to occupy at least a locked position and an unlocked position in order, depending on the case, to block or free the removable gripping device on this holding member.

The present invention is applicable to the field of kitchen utensils, and more particularly relates to removable gripping devices for such utensils.

2. Description of Related Art Including Information Disclosed Under 37 CFR 1.97 and 37 CFR 1.98

Different types of kitchen utensils are known, such as saucepans, frying pans or cooking pots, which differ, inter alia, by their sizes, as well as their gripping means. It is thus common for such utensils to include, as gripping means, only one handle, extending radially on the outer periphery. The user can therefore grasp the latter using one, or even both hands, depending on the weight to be lifted.

Compared to the section of the container, the section of the handle is relatively small, such that the resisting torque that may be exerted by some people through this handle in case of tilting of the kitchen utensil is relatively low.

That is why the largest utensils are equipped, depending on the case, with a handle and one or two holding members, positioned diametrically opposite one another on the periphery of the container. These holding members also have the advantage of a smaller bulk compared to a handle.

However, the particularity of the holding members lies in the fact that they extend in the immediate vicinity of the walls of the kitchen utensil. Consequently, they are often subject to very high temperatures, under the effect of the heat diffused by the heating device on which the utensil rests.

These gripping devices are also quite often made from a metal material making it possible to place the cooking utensil in an oven, unlike a frying pan or a sauce pan provided with a bulky handle, unless the latter has been provided to be removable.

The issue consequently lies in the ability to grasp such a cooking utensil via the handles equipping it, and which may be hot. Indeed, it is essential to use protective elements, such as potholders, to handle a cooking utensil with metal gripping devices.

Already known, in particular through document EP-1,315,440, is a removable gripping device for grasping, lifting, manipulating, pouring out kitchen utensils having two diametrically opposite ear-shaped holding members. More particularly, these holding members assume the form of metal flats, with a rectangular section or a rounded contour, attached substantially horizontally on either side of and outside the container of the cooking utensil. The gripping device includes a pair of shells made from a thermally insulating material able to removably cover these metal flats in the form of gripping devices. Each shell has a housing in the form of a slit emerging laterally and with dimensions adjusted to accommodate, with sufficient functional play, such an ear-shaped holding member. It should also be noted that a shell of this removable gripping device is equipped with a locking/unlocking device in the form of catching means able to cooperate with an aperture arranged in a holding member so as, depending on the case, to lock or unlock a shell on the latter.

More particularly, the locking/unlocking device is described, in this prior document, in the form of a plate mounted tilting, like a bolt, in a travel chamber arranged inside the shell. This plate is mounted pivoting around an axis parallel to the plane of the slit so as, by tilting into its blocking position, to cooperate, via a catching nose, with said aperture in the holding member, once the shell is nested on the latter.

An opening on the top of this shell makes it possible to access this locking/unlocking device to push it back into the unlocked position, against the action of elastic return means, tending to return it systematically to the locking position. It should be noted that the nose-shaped end of the bolt naturally leads to pushing it back toward its unlocked position under the impulse of a holding member, when the shell is engaged on the latter.

While the solution described in this document EP-1,315,440 sets out the design of the shell by assembling two half-shells capturing the locking/unlocking device, while each defining the slit-shaped housing, another embodiment is known from document EP-2,665,399. In this case, the shell adopts the form of a case including both the slit-shaped housing to accommodate the holding member of the kitchen utensil, and that making up the seat for the pivoting assembly of the plate or bolt of the locking/unlocking device. In this scenario, the case is closed by a lid.

Irrespective of these solutions of the state of the art, the slit-shaped housing is sized as closely as possible to the characteristics of the ear-shaped holding member, to within any functional play, necessary to allow the nesting and removal of the ear-shaped gripping device with respect to this holding member. It should also be noted that the latter, typically defined by a cut and/or stamped metal plate, necessarily meets machining allowances that should be taken into account to size this slit-shaped housing to guarantee easy nesting in all cases, even extreme cases, owing to the functional play.

It will also be understood that due to these machining allowances, the functional play may be excessive, such that excessive mobility of the gripping device on the holding member can be felt by a user as a lack of safety, and a risk of spilling the kitchen utensil.

Although the locking/unlocking device effectively resolves this risk of the gripping device detaching from a holding member, it cannot make up for this sensation of mobility. This is particularly true inasmuch as the bolt and its catching nose must themselves be sized so that their cooperation with the opening provided to that end in the holding member is provided, irrespective of the machining allowances and the compliance with the installation dimensions of the opening in this holding member.

An equivalent solution with the same drawbacks has been described in document U.S. Pat. No. 6,694,868.

In document U.S. Pat. No. 6,260,733, a removable handle device is described where the locking of the latter on the ring-shaped holding member is provided by an elastic blade that cannot resolve the issue of mobility between this device and the kitchen utensil it is called upon to lift. Indeed, here again, functional play is observed between the holding member of the kitchen utensil and the slit in the handle device, which gives the impression of insecurity when lifting this kitchen utensil.

It should be noted that in document FR 3,016,787, an attempt was made to resolve a similar problem of play between a removable handle and the catching tab of a kitchen utensil on which this handle attaches.

In this case, a deformable member in the form of a crushable silicone pellet is associated with the catching tab of the handle. When the handle is attached on the container and before one is locked on the other, this silicone pellet is separated so as to react the functional play typical between these elements.

In document FR 3,016,788, a similar state of the art is described, with the exception that the silicone pellet is further provided with a centering spur in its center, provided to be housed in a matching cavity arranged on the retaining bracket of the container.

Thus, when the cooperation is ensured between the removable handle and the attaching tab on the container consisting of attaching the former on the latter, then, through a rotational effect, bringing them closer to one another, the user must exert pressure exerted on the handle toward the catching tab to ensure this crushing of the silicone pellet, resulting in a risk of tilting of the kitchen utensil.

It should be noted that stressing this silicone pellet also makes the reverse unlocking operation more difficult.

Whatever the case may be, this solution of the state of the art does not make it possible to resolve the issue of functional play between a gripping device provided to nest, owing to a slit-shaped housing, on an ear-shaped holding member of a kitchen utensil.

As noted above, this functional play leads to a certain mobility of this gripping device relative to this holding member in a vertical direction, perpendicular to the plane of the holding member, but also in a direction parallel to this plane.

It is in the context of a first inventive approach that an effort has been made to resolve this issue of two-way functional play of a removable gripping device, able to be nested on an ear-shaped holding member of a kitchen utensil.

In the context of a second inventive approach, it has been considered to associate this functionality of eliminating functional play not with the case of the gripping device provided to receive the holding member of the kitchen utensil, but with at least one protective cover made from an insulating material mounted on this case. This configuration makes it possible to make this cover either completely or partially from a flexible material able to form, locally in the slit-forming housing of the case, an elastic stress to eliminate this functional play.

BRIEF SUMMARY OF THE INVENTION

To that end, the invention relates to a removable gripping device for an ear-shaped holding member of a kitchen utensil, including a case comprising a housing in the form of a slit with a width adapted to the thickness of the holding member to at least partially accommodate the latter by nesting and with functional play, this case being further provided with a latch able to occupy at least a locked position and an unlocked position in order, depending on the case, to block or free the removable gripping device on this holding member, characterized in that it comprises, in combination with and independently of the locking/unlocking function, at least one retaining pad extending at least partially in the slit-shaped housing so as to define, in the latter, at least one passage section adjusted, with a negative allowance, to the thickness of the holding member, at least this pad, in its part at least extending in said housing, being made from a flexible material to retract under stress upon passage of the holding member during the engagement of said device on the latter.

Advantageously, this device also comprises at least one elastically deformable stop extending at least partially in said housing and against which the end edge of the holding member bears under stress, when said device is mounted on the holding member and the catching means are in the locking position.

According to one particularity of the invention, at least one protective cover is mounted on the case by gluing, crimping, and/or via fastening members, such as screws, rivets or the like.

Other aims and advantages of the present invention will appear during the following description, relative to one example embodiment provided for information and non-limitingly.

BRIEF DESCRIPTION OF THE SEVERAL VIEWS OF THE DRAWINGS

The understanding of this description will be facilitated in reference to the attached drawings.

FIG. 1 is a schematic view of a planar illustration of a removable gripping device according to the invention, nested on an ear-shaped holding member.

FIG. 2 is a schematic cross-sectional view of an illustration along I-I of FIG. 1.

FIG. 3 is a schematic cross-sectional view of an illustration along II-II of FIG. 1.

DETAILED DESCRIPTION OF THE INVENTION

Figure 4:
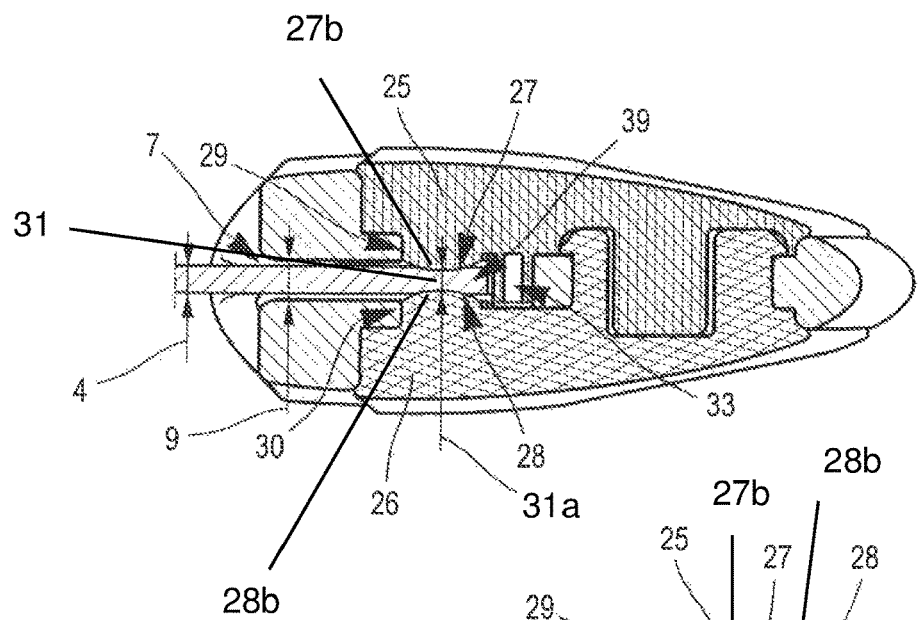
FIG. 4 is a schematic cross-sectional view of an illustration along III-Ill of FIG. 1.

As shown in the figures of the attached drawing, the present invention relates to a removable gripping device 1 for an ear-shaped holding member 2 equipping, generally on the upper border and outer periphery, a kitchen utensil 3 of the saucepan, frying pan, pot or other type and that has only been shown very partially in FIG. 1.

It should be noted that such an ear-shaped holding member 2 typically results from a cutting and bending operation of a metal flat having a determined thickness 4. This holding member 2 is attached, typically sealably, by crimping, riveting, screwing, welding or the like on the kitchen utensil 3. Of course, the invention is in no way limited to such a method for manufacturing this holding member 2. It may also be obtained by additive manufacturing.

In this ear-shaped holding member 2, at least one oblong opening 5 is generally produced intended to cooperate, as will be explained in more detail below, with attaching means of the removable gripping device 1.

The latter comprises a case 6 having a lateral case plane 41a, a median case plane 41, a top case side 6a and a bottom case side 6b opposite the top case side. The case is comprised of a housing or housing slit 7 in the form of a slit emerging at a lateral rim 8 of this case 6, which generally includes a substantially smaller thickness relative to its length and width. The housing slit 7 has a housing slit opening 7a, a housing slit end 7b opposite the housing slit opening, a first housing slit wall 7c and a second housing slit wall 7d opposite the first housing slit wall so as to define a slit height 9 perpendicular to the lateral case plane 41a.

The height 9 of this slit corresponding to the housing 7 is adapted to the thickness 4 of the holding member 2 in order to accommodate the latter at least partially with functional play in this direction corresponding to the width 9 of the housing 7.

Inasmuch as the holding member 2 typically extends in a substantially horizontal plane on the outer periphery of the kitchen utensil 3, reference will be made, in the rest of the description for ease of understanding, to play in a vertical direction.

It should be noted that the significance of the functional play depends on the acceptable allowances in terms of the thickness 4 of the metal flat in which the holding member 2 is made, but also machining allowances, for example by molding, of the housing 7 in the case 6. The latter can advantageously be made from metal, with the understanding that the invention is in no way limited to this material alone, this case 6 also being able to be made from any other material, in particular synthetic, capable of withstanding the temperatures to which the retaining members 2 of the kitchen utensil may be subjected.

The case 6 also accommodates a latch 11 able to occupy at least a locked 14 and unlocked (not visible) position in order, depending on the case, to block or free the removable gripping device 1 on a holding member 2.

Substantially and according to one example embodiment, this latch, forming catching means 10 similar to a bolt, assumes the form of a substantially rectangular plate, extending in an adapted housing 12 in the case 6, preferably substantially parallel to the plane of the housing 7. The housing 12 is advantageously provided to communicate with this housing 7. The latch 11 further comprises a hook-shaped end 13 for cooperating, in particular in the locking position 14, with the oblong opening 5 in the holding member 2.

The latch 11 is advantageously mounted tilting in the housing 12 around an axis or tilting axis plate 15a with a longitudinal axis 15.

Substantially, this axis or tilting axis plate 15a is defined by axis segments 16 extending on either side of the lateral edges of the latch 11 and assuming a position in housings forming bearings 17 arranged to that end in the case 6.

In the direction opposite its hook-shaped end 13, the latch 11 is extended, past its pivot axis 15, by a handling tongue 18 accessible through an adapted opening 19 in the case 6. Lastly, through this opening 19, the user is able to cause the latch 11 to tilt around its pivot axis 15, advantageously from a locking position 14 toward an unlocking position (not visible in the figures), against the action of elastic return means 20.

As shown in FIG. 2, these elastic return means 20 (shown, solely as an example, in the form of a spring), push the latch 11 back from its housing 12 toward the housing 7, therefore the holding member 2. Consequently, the thrust exerted on the handling tongue 18 tends to tilt the latch 11 in its housing 12, into its unlocked position, allowing the removable gripping device 1 to be removed with respect to the holding member 2.

Figure 6:
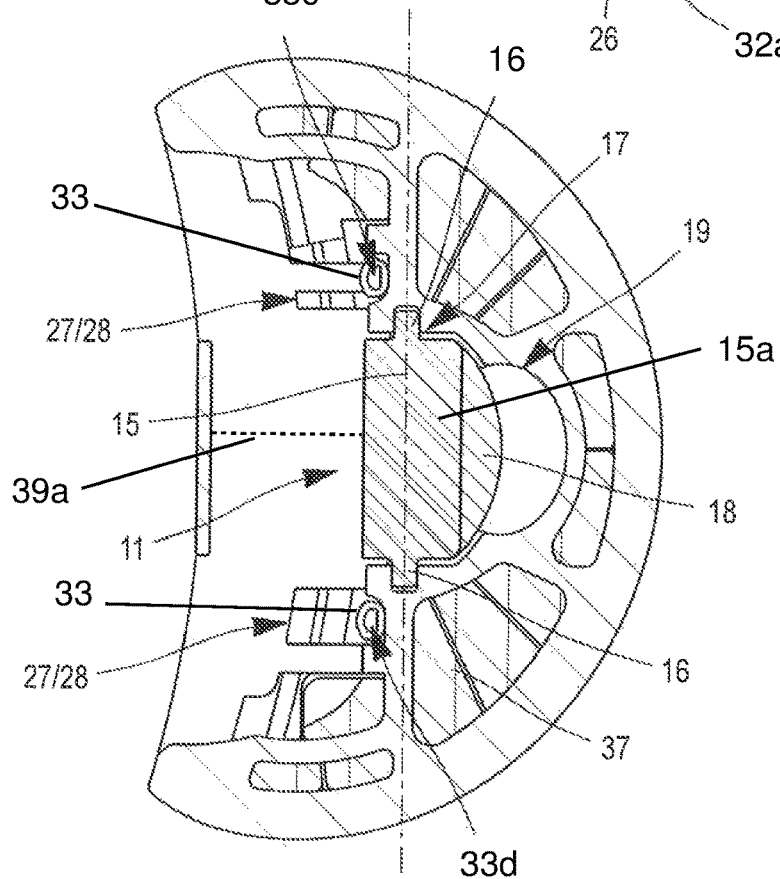
FIG. 6 is a schematic cross-sectional view of an illustration along VI-VI of FIG. 2 (the holding member not being shown).
Figure 7:
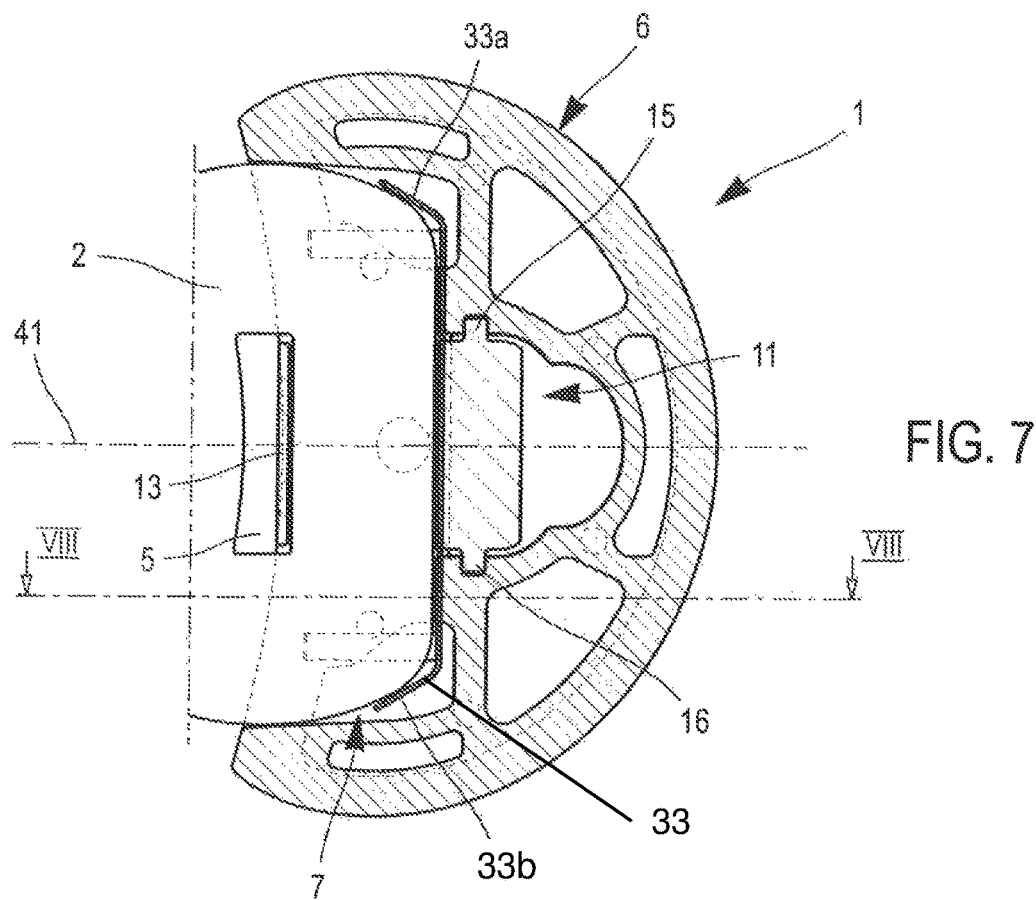
FIG. 7 is a schematic cross-sectional view similar to FIG. 6, corresponding to a second embodiment of the invention.

Advantageously and as shown in FIGS. 3, 6 and 7, the housings forming bearings 17 have an upside down V-shaped structure at the bottom of which the axis segments 16 are pushed under the action of elastic return means 20 on the latch 11 to avoid any detrimental play at the articulation of the latter.

As also shown in FIG. 2, the hook-shaped end 13 is configured in the form of a step. More particularly, this end 13 of the latch 11 includes a bevel 21. The latter, in cooperation with the edge of the end 22 of the holding member 2 when the removable gripping device 1 is engaged on the latter, leads to pushing the latch 11 back toward its unlocked position in its housing 12, against the action of said elastic return means 20.

Conversely, this hook-shaped end 13 also includes a catching rim 23, which, when it is positioned at the oblong opening 5 in the holding member 2, dives into this opening 5 under the impulse of elastic return means 20 while forming a step.

It should also be noted that advantageously, the latch 11 also includes a stop rim 24 against which the end edge 22 of the holding member 2 abuts, somewhat limiting the engagement of the latter in the housing 7. This stop rim 24 is arranged, relative to the catching rim 23, at a distance corresponding, to within any functional play, to the distance separating the edge of the end 22 from the oblong opening 5 of the holding member 2.

It should be noted that under the effect of engaging pressure of the gripping device 1 on the holding member 2, the action of the end edge 22 of the latter on this stop rim 24 results, due to the geometry of the latch 11, in pushing the latter back into its locking position 14 and keeping it in this position.

According to the invention, the removable gripping device 1 comprises, in combination with and independently of the locking and unlocking function, at least one retaining pad (a first retaining pad 27, a second retaining pad 28) extending at least partially in the slit-shaped housing 7. Thus, this or these retaining pads 27, 28 define, in this housing 7, at least one passage section 31, 32 with a respective passage section height 31a, 32a, adjusted, with a negative allowance, to the thickness 4 of the holding member 2. That is, the passage section height 31a, 32a is less than the slit height 9 so as to hold the holding member 2 tighter.

According to one embodiment, a first retaining pad 27 has a first flexible part 27b extending, at least partially in the housing 7. A second retaining pad 28 has a second flexible part 28b extending at least partially in the housing or housing slit 7. In one embodiment, the first flexible part 27b extends through an adapted opening as a first opening 29 in the case 6. The second flexible part 28b can extend through a second opening 30.

Furthermore, at least this retaining pad 27, 28, in its part at least extending in said housing 7, is made from an elastically deformable material to retract under stress upon passage of the holding member 2 during the engagement of said device 1 on the latter.

According to the invention, the removable gripping device also comprises at least one elastically deformable stop 33, here again extending at least partially in said housing or housing slit 7 to form a lateral choke 39a within the housing slit 7 and in the lateral case plane 41a. The end edge 22 of the holding member 2 bears under stress against this elastically deformable stop 33 at the housing slit end 7b when the removable gripping device 1 is mounted on this holding device 2 and the catching means 10 are in the locked position, in particular cooperating with the oblong opening 5 of this holding member 2 in the embodiments illustrated in figures.

Advantageously, at least one protective cover 25, 26, preferably, but not necessarily, made from an insulating material, is mounted on the case 6. A first protective cover 25 is mounted on the top case side 6a. A second protective cover 26 is mounted on the bottom case side 6b.

According to a first preferred embodiment, shown in FIGS. 2 to 6, this or these protective covers are equipped with the retaining pad(s) 27, 28 and/or the elastically deformable stop(s) 33.

While the retaining pads 27, 28 serve to eliminate the functional play between the removable gripping device 1 and a holding member 2, in a direction perpendicular to the plane of this holding member 2, called vertical, the elastically deformable stop(s) 33 serve to absorb the functional play of this removable gripping device 1 relative to the holding member 2 in a direction parallel to the plane of the latter.

Figure 5:
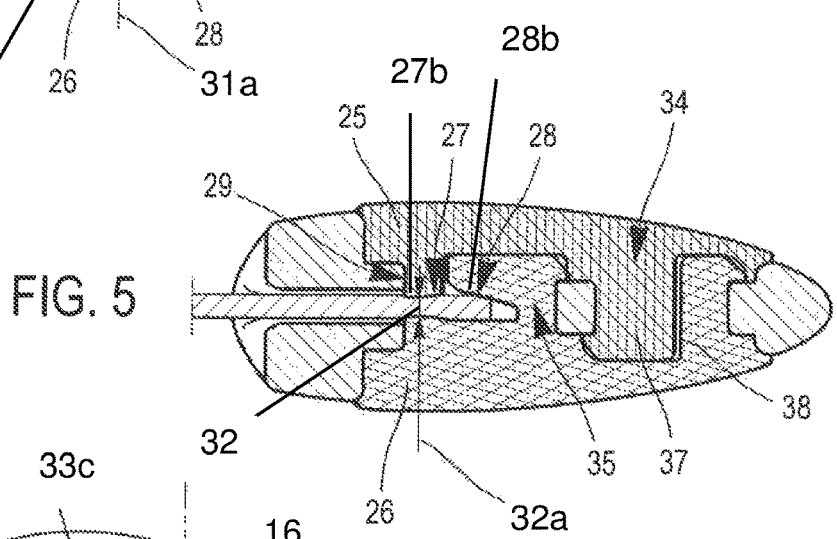
FIG. 5 is a schematic cross-sectional view of an illustration along IV-IV of FIG. 1.

In reference more particularly to FIGS. 3 to 5, illustrating, in the context of the first preferred embodiment, different variants of the invention, one sees that a protective cover made from an insulating material 25, 26, respectively, is mounted on either side of the case 6.

These protective covers 25, 26 can be mounted on this case 6 by gluing, crimping, and/or via fastening members, such as screws, rivets or the like.

However, according to one advantageous embodiment, a protective cover 25 includes means 34 for nesting and/or clipping on complementary nesting and/or clipping means 35 included by the protective cover 26 on the opposite side and/or the case 6.

As an example embodiment, these means 34, 35 are illustrated in these FIGS. 3 to 5 in the form of studs 37 provided to engage in housings 38 arranged, depending on the case, in a protective cover 26 and/or at the case 6.

In FIGS. 4 and 6, an embodiment is illustrated where each of these protective covers 25, 26 includes a retaining pad 27, 28 engaging partially in the housing 7 on either side of the latter while locally creating a choke 39 at the passage of the holding member 2 in order to eliminate the functional play between the latter and the gripping device 1 in the direction perpendicular to the plane of said holding member 2.

In FIG. 5, the protective covers 25, 26 respectively define retaining pads 28 extending partially on a same side in the housing 7 while defining an adjusted passage width 32 with a negative allowance relative to the thickness 4 of the holding member 2.

The elastically deformable stop 33 may substantially assume the form of a first elastically deformable pin 33c and a second elastically deformable pin 33d associated with at least one of the protective covers 25, 26 to extend at least partially in the housing 7 so as to form a stop at the end edge 22 of the holding member 2, when the latter is inserted on the removable gripping device 1.

According to another particularity of the present invention, the removable gripping device 1 includes at least one retaining pad 27, 28 acting, under the aforementioned conditions, on the holding member 2, on either side of a median plane 41 of the removable gripping device 1.

More particularly, at least one retaining pad 27, 28 acts on the holding member 2, on either side of the latch 11 when the removable gripping device 1 is nested on this holding member 2.

Likewise, according to one preferred embodiment, the removable gripping device 1 includes at least one elastically deformable stop 33 able to cooperate with the end edge 22 of the holding member 2, on either side of the median plane 41, in short, on either side of the latch 11 in the illustrated embodiment.

According to these different embodiments of the invention, the retaining pad(s) 27, 28 and/or the elastically deformable stop 33 are designed from a synthetic elastically deformable material, for example silicone.

Furthermore, the protective cover(s) 25, 26 are made from an elastically deformable synthetic material, in particular silicone.

According to still another advantageous particularity of the invention, the protective covers 25, 26 are symmetrical relative to the transverse median plane 41. In short, these are identical parts resulting from a same manufacturing mold.

Figure 8:
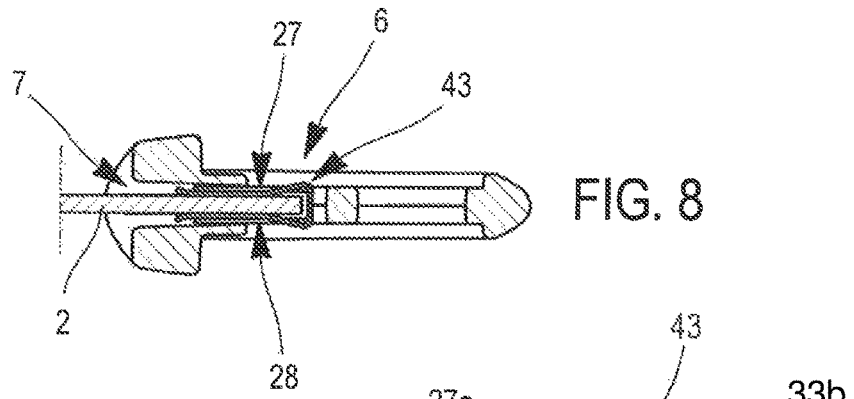
FIG. 8 is a cross-sectional view of an illustration along VIII-VIII of FIG. 7.
Figure 9:
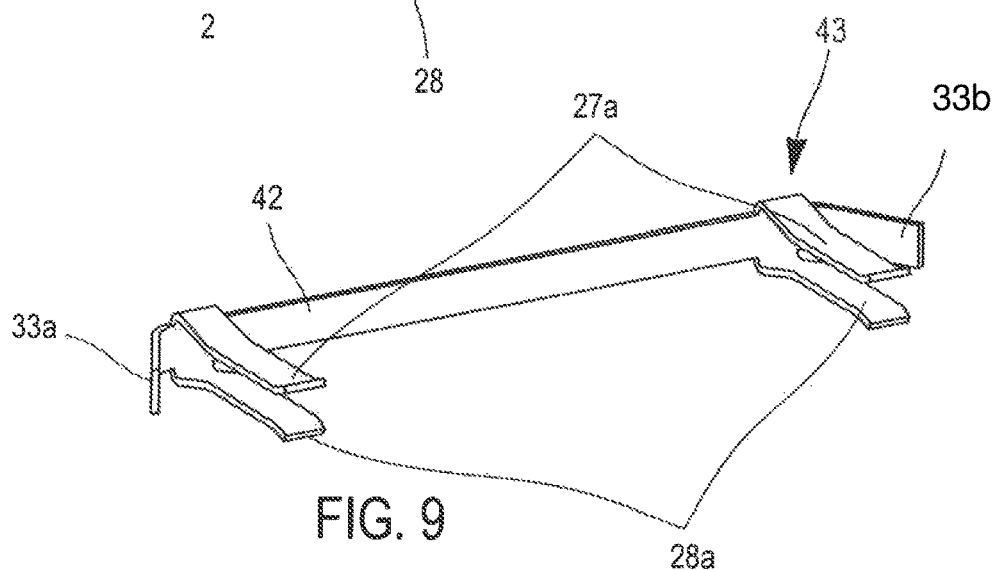
FIG. 9 is a perspective view of an illustration of the embodiment of the retaining pads and stops defined by the elastic blades.

It should be noted that although in the embodiments described above and illustrated in FIGS. 2 to 6, the retaining pads 27, 28 and the elastically deformable stops 33 are associated with the protective covers 25, 26, it is entirely possible to consider an embodiment where they are separated therefrom, as FIGS. 7 to 9 are intended to show, illustrating a second embodiment of the invention.

In particular, and as shown in these figures, they may also assume the form of elastic blades 27a, 28a, 33a, made from metal or plastic.

In particular, these elastic blades (a first elastic blade 27a, a second elastic blade 28a) defining these retaining pads 27, 28 here again extend at least partially, through at least one suitable opening (a first opening 29, a second opening 30) in the case 6, in the slit-shaped housing 7, in order to define, in the latter, at least one passage section 31, 32 adjusted, with a negative allowance, to the thickness 4 of the holding member 2.

The elastically deformable stop 33 may also be a first stop blade 33a and a second stop blade 33b, both extending at least partially in said housing 7. The end edge 22 of the holding member 2 bears under stress against these elastically deformable stop blades 33a, 33b when the removable gripping device 1 is mounted on this holding device 2 and the catching means 10 are in the locked position.

Advantageously, the blades 27a, 28a, 33a, and 33b, respectively corresponding to the retaining pads 27, 28 and to a stop 33, can be connected by a junction plate 42, so as to form only one single same piece 43 in order to facilitate its assembly in the housing 7 of the removable gripping device 1.

Like for the previous embodiment, a symmetrical construction can be considered, and is even desirable. Thus, the removable gripping device 1 includes at least one retaining pad 27, 28, in the form of a blade 27a, 28a, acting, under the aforementioned conditions, on the holding member 2, on either side of a median plane 41 of the removable gripping device 1.

More particularly, at least one blade 27a, 28a acts on the holding member 2, on either side of the latch 11 when the removable gripping device 1 is nested on this holding member 2.

Likewise, the removable gripping device 1 includes at least one elastically deformable stop 33 in the form of a blade 33a able to cooperate with the end edge 22 of the holding member 2, on either side of the median plane 41, in short, on either side of the latch 11 in the illustrated embodiment.

Thus, and as shown in FIG. 9, the junction blade 42 bears, at each of its ends, on the one hand a pair of blades 27a, 28a, forming the retaining pads 27 and 28, and on the other hand a blade 33a, corresponding to the elastically deformable stop 33.

As already indicated above, this piece 43 can be made from plastic or metal, chosen for its elasticity.

In a manner not visible in FIGS. 7 and 8, one or several protective covers 25, 26 can be mounted on the case 6, like in the embodiment corresponding to FIGS. 2 to 6.

The advantages resulting from the present invention consist of the fact that while retaining the functional play, which is mechanically necessary to guarantee nesting of the removable gripping device on a kitchen utensil holding member in all cases, taking machining allowances into account, the functional play is made imperceptible by the user, whereas it typically results in a lack of assurance, or even a risk of spilling from the kitchen utensil.

We claim:

1. A removable gripping device for an ear-shaped holding member of a kitchen utensil, the device comprising:
    a case having a lateral case plane, a median case plane, a top case side and a bottom case side opposite said top case side, and being comprised of a housing slit parallel to said lateral case plane, said housing slit having a housing slit opening, a housing slit end opposite said housing slit opening, a first housing slit wall and a second housing slit wall opposite said first housing slit wall so as to define a slit height perpendicular to said lateral case plane;
    a latch being set within said housing slit between said first housing slit wall and said second housing slit wall in a locked position and being set outside of said housing slit in an unlocked position;
    a first retaining pad being comprised of a first flexible part extending into said housing slit from said first housing slit wall so as to define a passage section with a passage section height,
    wherein said passage section is contiguous with said housing slit, and
    wherein said passage section height is less than said slit height; and
        an elastically deformable stop extending into said housing slit from said housing slit end.

2. The device according to claim 1, wherein said elastically deformable stop and said latch in said locked position define a lateral choke within said housing slit and in said lateral case plane.

3. The device according to claim 1, further comprising:
    a second retaining pad being comprised of a second flexible part extending into said housing slit from said second housing slit wall so as to define said passage section with said passage section height, said passage section being a choke within said housing slit.

4. The device according to claim 1, further comprising:
    a second retaining pad being comprised of a second flexible part extending into said housing slit from said first housing slit wall so as to define said passage section with said passage section height.

5. The device according to claim 1, wherein said elastically deformable stop is comprised of a first elastically deformable pin and a second elastically deformable pin.

6. The device according to claim 1, wherein said passage section height is perpendicular to said lateral case plane.

7. The device according to claim 1, wherein said elastically deformable stop is positioned on either side of said median case plane.

8. The device according to claim 1, further comprising:
    a first protective cover mounted on said top case side of said case.

9. The device according to claim 8, further comprising a second protective cover mounted on said bottom case side of said case.

10. The device according to claim 8, wherein said first protective cover is made integral with said first retaining pad.

11. The device according to claim 9, wherein said first protective cover is symmetrical across said median case plane, and wherein said second protective cover is symmetrical across said median case plane.

12. The device according to claim 1, wherein said elastically deformable stop is comprised of a first stop blade and a second stop blade.

13. The device according to claim 1, further comprising:
    an elastic return means adjacent to said latch so as to set said latch in said locked position and in said unlocked position,
    wherein said case is further comprised of an adapted housing adjacent to said housing slit, said latch being within said adapted housing in said unlocked position,
    wherein said latch is comprised of a hook-shaped end facing toward said housing slit opening, and a tilting axis plate with a longitudinal axis and axis segments extending from said tilting axis plate along said longitudinal axis;
    wherein said case is comprised of V-shaped bearings, said axis segments being set in respective V-shaped bearings, said latch being tilted into said adapted housing in said unlocked position and into said housing slit in said locked position at said longitudinal axis of said tilting axis plate.

14. A removable gripping device for an ear-shaped holding member of a kitchen utensil, the device comprising:
- a case having a lateral case plane, a median case plane, a top case side and a bottom case side opposite said top case side, and being comprised of a housing slit parallel to said lateral case plane, said housing slit having a housing slit opening, a housing slit end opposite said housing slit opening, a first housing slit wall and a second housing slit wall opposite said first housing slit wall so as to define a slit height perpendicular to said lateral case plane;
- a latch being set within said housing slit between said first housing slit wall and said second housing slit wall in a locked position and being set outside of said housing slit in an unlocked position;
    - a first retaining pad being comprised of a first flexible part extending into said housing slit from said first housing slit wall so as to define a passage section with a passage section height,
    - wherein said passage section is contiguous with said housing slit, and
    - wherein said passage section height is less than said slit height; and
        - a second retaining pad being comprised of a second flexible part extending into said housing slit from said second housing slit wall so as to define said passage section with said passage section height, said passage section being a choke within said housing,
- wherein said first retaining pad is comprised of a first elastic blade,
    - wherein said first housing slit wall has a first opening,
    - wherein said second retaining pad is comprised of a second elastic blade,
    - wherein said second housing slit wall has a second opening,
    - wherein said first elastic blade extends through said first opening and said second elastic blade extends through said second opening so as to define said passage section.

15. The device according to claim 14, further comprising:
- an elastically deformable stop extending into said housing slit from said housing slit end, wherein said elastically deformable stop is comprised of a first stop blade and a second stop blade; and
- a junction plate connected to said first elastic blade, said second elastic blade, said first stop blade, and said second stop blade, so as to form a same piece.

* * * * *